H. C. OTTERSTEDT.
PROCESS FOR THE PRODUCTION OF OAT GROATS AND THE LIKE.
APPLICATION FILED OCT. 20, 1920.
1,423,450.                                                                 Patented July 18, 1922.
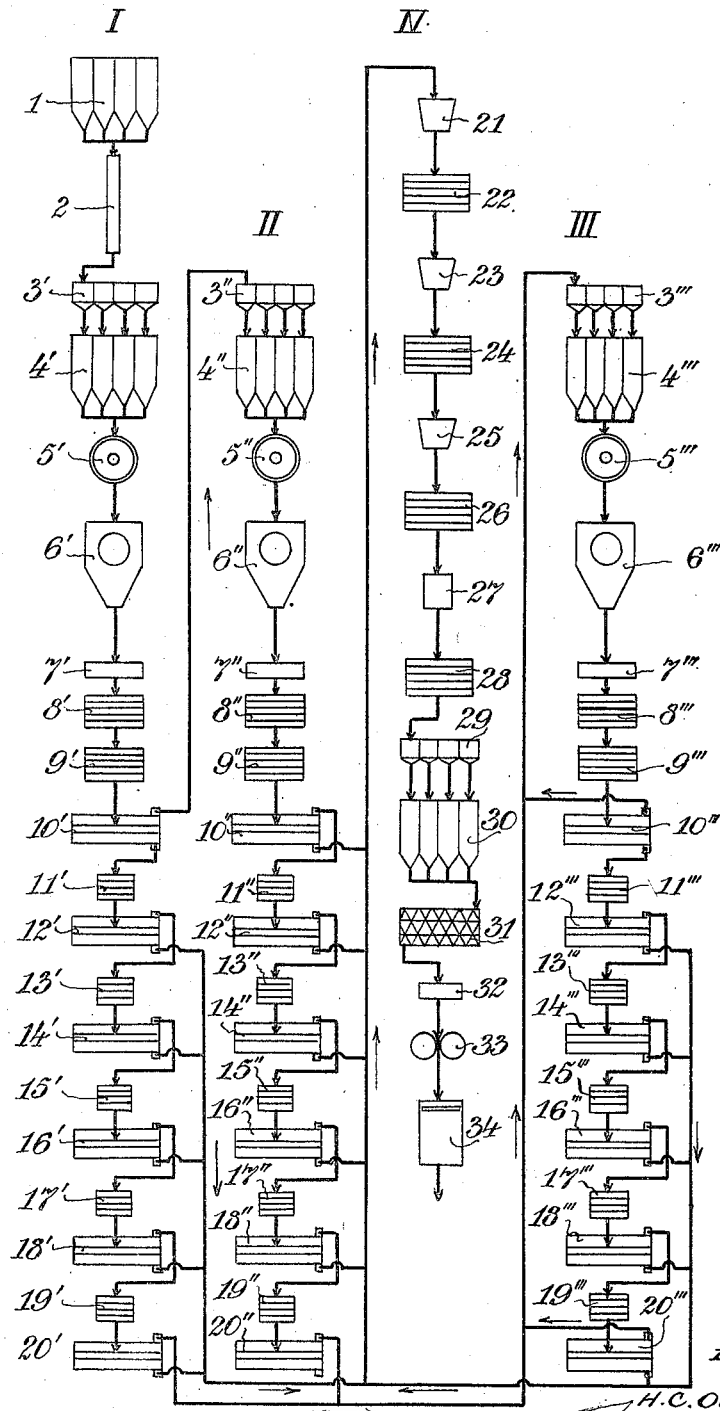
Inventor.
H. C. Otterstedt.
by ____ Atty

UNITED STATES PATENT OFFICE.

HANS CHRISTIAN OTTERSTEDT, OF SVALOF, SWEDEN.

PROCESS FOR THE PRODUCTION OF OAT GROATS AND THE LIKE.

1,423,450. Specification of Letters Patent. Patented July 18, 1922.

Application filed October 20, 1920. Serial No. 418,254.

*To all whom it may concern:*

Be it known that I, HANS CHRISTIAN OTTERSTEDT, a citizen of Sweden, residing at Svalof, Sweden, have invented certain new and useful Improvements in Processes for the Production of Oat Groats and the like, of which the following is a specification, reference being had to the accompanying drawing.

This invention relates to a process for the production of oat-groats and the like. It has been proved by trials that a yield about 15% higher than that hitherto obtained will be the result by using the new process. According to the invention the oats or the like are first carried through a preparing system in a known way, in which the material is subject to a preparation for hulling and for separating the hulls together with the material incompletely hulled from the thoroughly hulled material. From here the material is carried through a series of selecting machines, in which a portion ready for finishing is removed, while the rest from each selector is carried to the next selector in the series etc., until the final rest on the whole is not longer fit to be treated in the selecting machines. This final rest may again be carried to the same or to another preparing system and the material taken out from the selecting machines passes as usual to a finishing system for final treatment. The new feature of the invention thus consists in using a plurality of selecting machines connected in series, the first of these machines preferably being what is called a fore selector and the rest of them after selectors. From the fore selecting machine the separated material is preferably again carried to the same or to another preparing system and only the portions separated by the after selecting machines pass to the finishing system. A plurality of systems may to advantage be combined as described in the following.

In order that the invention may be the better understood, it will be described with reference to the accompanying drawing, showing a diagram containing three different preparing systems.

The three preparing systems are in the drawing indicated by I, II and III, and the finishing system is indicated by IV. The apparatus corresponding to each other in the systems I, II and III are indicated by similar reference numerals in the different systems.

In the system I a receptacle 1 contains cleaned and sorted oats, which are carried from this receptacle, as shown by the arrow, to a steam drying apparatus 2 wherein the oats are dried. From here they are carried to a sifting apparatus 3' for sorting the dried oats which are collected in a receptacle 4' and from here carried to a hulling machine 5', wherein they are hulled. 6' indicates a centrifugal brushing sieve in which they are brushed and wherein the lighter fodder meal is separated, whereafter better fodder meal and smaller grain particles are separated in a shuttle sieve 7'. The oats pass after that into a double aspirator 8' wherein the hulls are separated from the hulled oat grains and unhulled oat grains which hulled grains are thereafter polished in an aspirator 9'. The material passes now into a fore selecting apparatus 10' in which the oat grains not hulled in the proportion hereinafter specifically referred to are separated from the hulled ones, which latter together with the unhulled grains which have not been separated pass further to an aspirator 11' for removing lighter hull particles and meal dust formed during the process. From the aspirator 11' the material is carried into an after selecting apparatus 12' wherein a smaller quantity of thoroughly clean-hulled grains is separated from the grains coming from the fore selector 10'. This quantity of absolutely clean-hulled grains is carried to the system IV for after treatment, while the rest is carried to an aspirator 13' to be treated in the same way as in the aspirator 11' and from there to an after selecting apparatus 14', wherein another smaller quantity of absolutely clean-hulled grains is separated. The material passes in this way from the after selector 14' alternately through a number of aspirators 15', 17', 19' and after selectors 16', 18', 20' during permanent separation of clean-hulled grains, which pass to the system IV.

The oats not hulled as separated by the fore selecting apparatus 10' are carried to the system II which from the sieve 3' consists of the same apparatus as the system I and through which apparatus the material is treated substantially in the same manner as in the system I. The incompletely treated material separated from the after selecting apparatus 20' is carried to the system III which also consists of substantially the same apparatus as the systems I and II, as shown in the drawing. In the system II the incompletely treated material is carried from the selecting apparatus 10'' to the aspirator 11'' and the clean-hulled grains pass directly to the system IV, and the material passes from the aspirator 11'' during stepwise separation of finished grains through the series of selecting apparatus and aspirators to the selecting machine 20'' and from this separated oats not hulled are carried to the system III.

The material carried to the system III passes, as in the systems I and II, through suitable apparatus such as a sifting apparatus 3''', a collection receptacle 4''', a hulling machine 5''', a centrifugal brushing sieve 6'''; a shuttle sieve 7''', a double aspirator 8''', and an aspirator 9''', and the material not hulled separated from the first selector 10''' is carried to the sieve 3''' for repeated treatment in the apparatuses mentioned above. The hulled grains are as in the system I, carried from the selector 10''' to the aspirator 11''' and from this to the selector 12''' etc. during stepwise separation of finished grains which are carried directly to the system IV. The grains not hulled separated from the selector 20''' pass to the sieve 3''' in the same system for repeated treatment.

The grains prepared and separated in the systems I–III pass in a continuous series to the system IV which consists of the following apparatus successively: a grinding apparatus 21 in which the outer tissue of the hulled oat grains are carefully ground off, an aspirator 22 for removing of meal dust and lighter particles, grinding apparatuses 23, 25 and aspirators 24, 26 alternately for the same purpose, a polishing apparatus 27 adapted to make the outer tissue of the oat grains shining, an aspirator 28 for removing the meal dust, a sieve 29 for sorting in different sizes, a receptacle 30 for collecting the groats, a steam treating apparatus 31, a shuttle sieve 32 for removing smaller dough lumps formed during the treatment with steam, a rolling machine 33 for pressing the groats and last a steam drying apparatus 34 for drying the pressed groats. The prepared grains pass through these machines in a known way and then they are ready for packing by means of suitable machines.

In the selecting machine 10' about 30% of the grains not hulled are separated and carried to the system II. The remaining 70% which passes on through the system I consists largely of hulled grains, but naturally there will be in this 70% a proportion of grains which are not as thoroughly hulled as is desired, this proportion of not thoroughly hulled grains is about 5% of the 70% bulk still being handled in the system I. This 70% bulk passes then for further treatment in the after selectors of system I, and thereby, at each step, that is, each after selector, a large proportion of the completely hulled grains are divided out. The grains remaining after each dividing out of completely hulled grains continue on through the system I, until in the final selector of system I so much of the completely hulled grains have been divided out, that it is practically an impossibility to carry the separation any farther. From the last selector of system I, there will therefore remain a residue, consisting substantially of incompletely hulled grains intermingled with a very small percentage of clean hulled grains, as it is absolutely impossible to entirely divide out all clean hulled grains. This residue from the final selector of system I, is delivered to system III for a repeated hulling operation.

From the not thoroughly hulled grains separated by the fore selector 10' a corresponding percentage of prepared grains will be extracted in the system II in the selectors 10'', 12'', 14'', 16'', 18'', 20'', and only a smaller percentage is carried from the selector 20'' to the system III to be treated again together with grains separated by the selector 20' until all the material has been completely prepared. It is evident that the apparatuses belonging to the different systems may be adapted to the quantity and the quality of the material to be treated.

The process described may be suited to any capacity without digressing from the invention. For instance the number and arrangement of the machines belonging to the different systems is dependent of the material to be treated. More than three systems may also be used, the not thoroughly hulled grains from one system being carried to the next, while ready prepared material is carried directly and successively to the apparatuses for after treatment.

Having thus fully described my said invention what I claim as new and desire to secure by Letters Patent is:—

1. A process for the production of oat groats, consisting in first treating the oats for the purpose of hulling the same and for initial separation of the hulls and the material not thoroughly hulled in part from the cleaned hulled material, then subjecting the cleaned hulled material and the included material not thoroughly hulled to independent and successive separation to divide therefrom at each separation a proportion of the cleaned hulled material, then subjecting all of the cleaned hulled material from each separating step to a final treatment and returning all other material from the final separating step for initial treatment.

2. A process for the production of oat groats and the like, consisting in initially treating the oats for hulling the same and for separating the hulls and the material not thoroughly hulled in part from the cleaned hulled material, then subjecting the cleaned hulled material and included material not thoroughly hulled to a series of successive separating steps, at each of which a proportion of cleaned hulled material is separated from the mass, then subjecting the cleaned hulled material from each of said separating steps to a final treatment and subjecting the material not thoroughly hulled from the first separating step and the material from the last of the series of separating steps to an initial treatment.

In testimony whereof, I have signed my name to this specification in the presence of two subscribing witnesses.

HANS CHRISTIAN OTTERSTEDT.

Witnesses:
H. BRAUZELL,
G. PETERSSEN.